(12) United States Patent
Ishikawa

(10) Patent No.: US 12,152,516 B2
(45) Date of Patent: Nov. 26, 2024

(54) INTERNAL COMBUSTION ENGINE

(71) Applicant: TOYOTA JIDOSHA KABUSHIKI KAISHA, Aichi-ken (JP)

(72) Inventor: Masami Ishikawa, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 210 days.

(21) Appl. No.: 18/146,469

(22) Filed: Dec. 27, 2022

(65) Prior Publication Data

US 2023/0287814 A1 Sep. 14, 2023

(30) Foreign Application Priority Data

Mar. 3, 2022 (JP) ................ 2022-032302

(51) Int. Cl.
| | |
|---|---|
| *F01M 13/04* | (2006.01) |
| *F02M 25/06* | (2016.01) |
| *F02M 35/10* | (2006.01) |
| *F01M 13/00* | (2006.01) |

(52) U.S. Cl.
CPC ........ *F01M 13/0416* (2013.01); *F02M 25/06* (2013.01); *F02M 35/10222* (2013.01); *F01M 2013/0038* (2013.01)

(58) Field of Classification Search
CPC .... F01M 3/0416; F01M 3/0405; F02M 25/06; F02M 2013/0038
See application file for complete search history.

(56) References Cited

U.S. PATENT DOCUMENTS

| | | | |
|---|---|---|---|
| 2015/0247432 A1* | 9/2015 | Fujikawa | F01M 13/023 |
| | | | 123/573 |
| 2019/0234262 A1* | 8/2019 | Ishikawa | F02B 75/22 |
| 2020/0095911 A1* | 3/2020 | Iwahashi | F01M 13/0416 |
| 2020/0123944 A1* | 4/2020 | Ishikawa | F02D 9/08 |

FOREIGN PATENT DOCUMENTS

| | | |
|---|---|---|
| JP | 2006-068190 A | 3/2006 |
| JP | 2019132233 A | 8/2019 |
| JP | 202067008 A | 4/2020 |
| JP | 2020183737 A | 11/2020 |
| JP | 2021-113521 A | 8/2021 |

\* cited by examiner

*Primary Examiner* — George C Jin
(74) *Attorney, Agent, or Firm* — HAUPTMAN HAM, LLP

(57) ABSTRACT

The internal combustion engine includes a second separator, a connection pipe, and a pressure sensor. Inside the second separator, a main chamber located in the cylinder head cover, and a first sub-chamber and a second sub-chamber located in a joint portion located outside the cylinder head cover are formed. The first sub-chamber and the second sub-chamber are partitioned by partition walls. A communication hole connecting the first sub-chamber and the second sub-chamber is formed in the partition wall. The first sub-chamber is connected to the main chamber via a throttle portion. A first connection port connected to the first sub-chamber and a second connection port connected to the second sub-chamber are formed in the joint portion. The first connection port is connected to the intake passage via a connection pipe. The second connection port is connected to the pressure sensor.

7 Claims, 3 Drawing Sheets

INTERNAL COMBUSTION ENGINE

CROSS-REFERENCE TO RELATED APPLICATION

This application claims priority to Japanese Patent Application No. 2022-032302 filed on Mar. 3, 2022, incorporated herein by reference in its entirety.

BACKGROUND

1. Technical Field

The present disclosure relates to an internal combustion engine.

2. Description of Related Art

Japanese Unexamined Patent Application Publication No. 2019-132233 (JP 2019-132233 A) discloses an internal combustion engine including a blow-by gas processing device. The blow-by gas processing device is a device for processing blow-by gas that has leaked from a combustion chamber of the internal combustion engine to a crankcase, by causing the blow-by gas to return from a cylinder head cover to an intake passage. The blow-by gas processing device includes a pipe joint and a connection pipe.

The pipe joint is provided on the cylinder head cover of the internal combustion engine. The pipe joint is connected to the intake passage of the internal combustion engine via the connection pipe. A throttle portion is provided inside the pipe joint. Accordingly, the connection pipe communicates with the inside of the cylinder head cover via the throttle portion of the pipe joint. The inside of the cylinder head cover and the intake passage communicate with each other by the pipe joint and the connection pipe. The pipe joint is provided with a union portion. The union portion is located between a portion of the pipe joint to which the connection pipe is connected and the throttle portion. A pressure sensor is connected to the union portion.

When the connection pipe is disconnected from the pipe joint or from the intake passage, the pressure value detected by the pressure sensor changes suddenly. Therefore, by monitoring the pressure value detected by the pressure sensor, it is possible to detect that the connection pipe is disconnected. Also, when the connection pipe is damaged, the pressure value detected by the pressure sensor changes suddenly. Therefore, by monitoring the pressure value detected by the pressure sensor, it is also possible to detect damage to the connection pipe.

SUMMARY

Meanwhile, during operation of the internal combustion engine, pulsation of the intake air occurs in the intake passage, and pulsation of the gas accompanying the reciprocation of the piston occurs in the crankcase. Thus, when the pulsations above propagate through the connection pipe, the pressure value detected by the pressure sensor also fluctuates due to the influence of the pulsations. As a result, an abnormality such as disconnection or damage of the connection pipe cannot be appropriately detected.

Hereinafter, means for solving the above issue and its operations and effects will be described. An internal combustion engine that solves the above-described issue includes a blow-by gas processing device that processes blow-by gas that has leaked from a combustion chamber to a crankcase, by causing the blow-by gas to return to an intake passage. The blow-by gas processing device includes an oil separator, a connection pipe, and a pressure sensor. The oil separator is provided in a cylinder head cover, and includes a main chamber and a sub-chamber provided inside. The oil separator includes a joint portion constituting the sub-chamber and a throttle portion connecting the sub-chamber to the main chamber. The sub-chamber is a first sub-chamber and a second sub-chamber partitioned by a partition wall. A communication hole connecting the first sub-chamber and the second sub-chamber is provided in the partition wall. The first sub-chamber is connected to the main chamber via the throttle portion. A first connection port connected to the first sub-chamber and a second connection port connected to the second sub-chamber are provided in the joint portion. The first connection port is connected to the intake passage via the connection pipe. The second connection port is connected to the pressure sensor.

According to the above configuration, the pressure sensor is connected to the first sub-chamber via the second sub-chamber and the communication hole. Therefore, even when the pulsation propagates to the first sub-chamber, the pulsation is mitigated while the pulsation passes from the first sub-chamber through the communication hole and the second sub-chamber. Therefore, it is possible to suppress a fluctuation caused by the influence of the pulsation in the pressure value detected by the pressure sensor. As a result, by monitoring the pressure value detected by the pressure sensor, it is possible to appropriately detect an abnormality in the connection pipe. Further, the first sub-chamber and the second sub-chamber are provided by partitioning the inside of the joint portion by a partition wall. Therefore, the second sub-chamber is provided for mitigating the pulsation above without taking a large space. Accordingly, the structure for mitigating the pulsation above can be realized with a small space.

In the above-described internal combustion engine, the main chamber of the oil separator is located on an inner side of the cylinder head cover. The joint portion of the oil separator is located on an outer side of the cylinder head cover.

The first sub-chamber and the second sub-chamber in the joint portion are disposed along the cylinder head cover.

According to the above configuration, the first sub-chamber and the second sub-chamber are positioned so as to be aligned along the cylinder head cover. Therefore, it is possible to reduce the amount of projection of the joint portion in which the first sub-chamber and the second sub-chamber are provided inside from the cylinder head cover.

In the above-described internal combustion engine, it is conceivable that the communication hole and the first connection port are provided such that axes of the communication hole and the first connection port do not coincide with each other. According to this configuration, even when the pulsation of the intake air in the internal combustion engine propagates to the first sub-chamber via the connection pipe and the first connection port, the pulsation is less likely to propagate to the second sub-chamber via the communication hole. Therefore, it is possible to more effectively suppress a fluctuation caused by the influence of the pulsation above in the pressure value detected by the pressure sensor.

In the above-described internal combustion engine, it is conceivable that the communication hole and the throttle portion are provided such that axes of the communication hole and the throttle portion do not coincide with each other. According to this configuration, even when the pulsation of the gas in the crankcase in the internal combustion engine propagates to the first sub-chamber via the main chamber and the throttle portion, the pulsation is less likely to propagate to the second sub-chamber via the communication hole. Therefore, it is possible to more effectively suppress a fluctuation caused by the influence of the pulsation above in the pressure value detected by the pressure sensor.

In the above-described internal combustion engine, it is conceivable that the partition wall is connected to an inner wall of the joint portion. According to this configuration, since the joint portion can be reinforced by the partition wall, it is possible to suppress vibration of the joint portion and generation of noise caused by the vibration.

In the above-described internal combustion engine, it is conceivable that the throttle portion and the first connection port are provided such that axes of the throttle hole and the first connection port coincide with each other. According to this configuration, it is possible to smoothly flow the gas between the throttle portion and the first connection port in the first sub-chamber. With the above, the pulsation above is less likely to propagate to the second sub-chamber via the communication hole. Therefore, it is possible to more effectively suppress a fluctuation caused by the influence of the pulsation above in the pressure value detected by the pressure sensor.

In the above-described internal combustion engine, it is conceivable that a distance from the throttle portion to the communication hole is longer than a distance from the throttle portion to the first connection port. According to this configuration, the second sub-chamber can be further separated from the gas flow between the throttle portion and the first connection port. With the above, the pulsation is less likely to propagate to the second sub-chamber via the communication hole. Therefore, it is possible to more effectively suppress a fluctuation caused by the influence of the pulsation above in the pressure value detected by the pressure sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
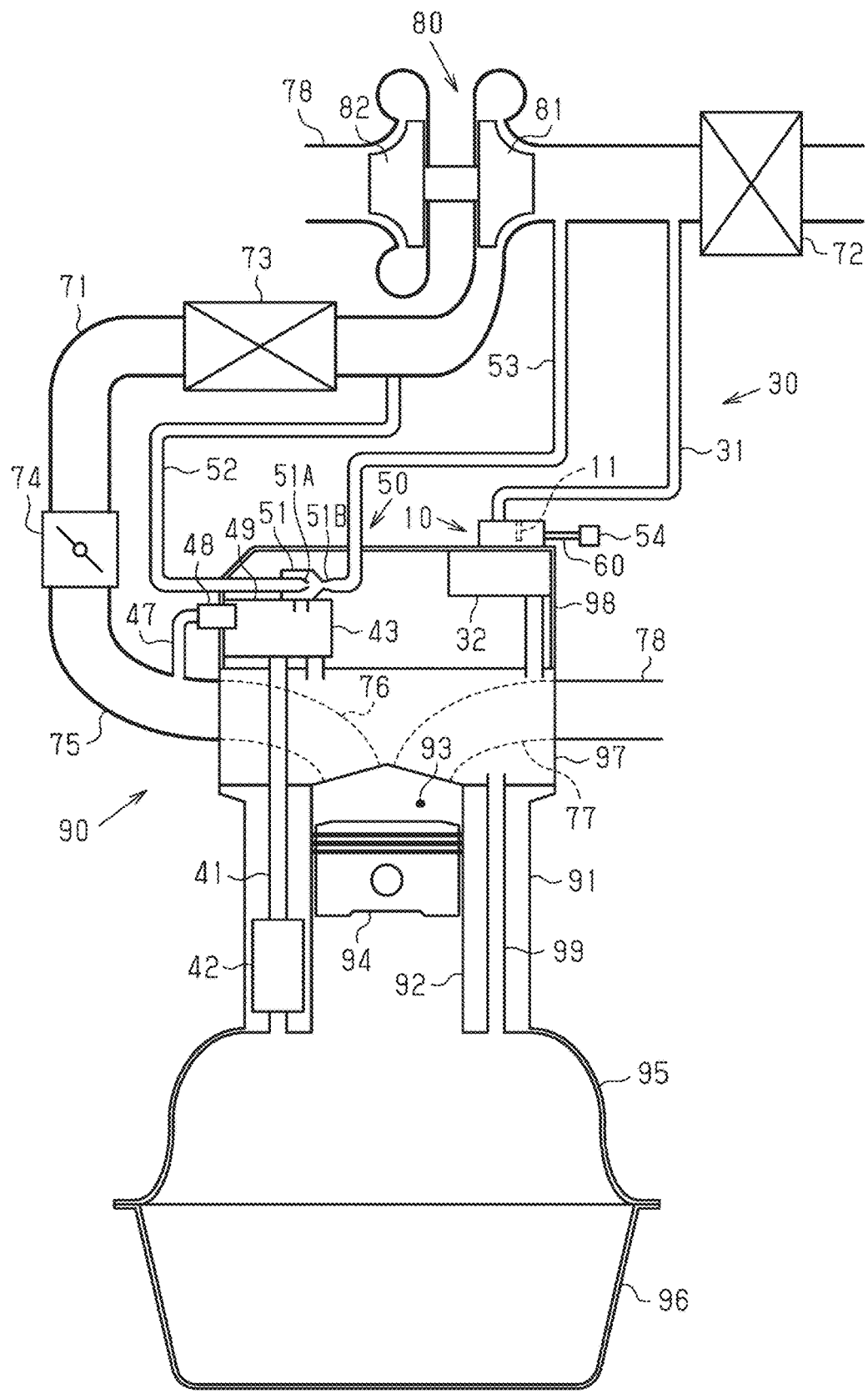
FIG. 1 is a schematic diagram illustrating an internal combustion engine.

Hereinafter, a first embodiment of an internal combustion engine will be described with reference to FIGS. 1 and 2. As shown in FIG. 1, the internal combustion engine 90 includes a cylinder block 91, a cylinder head 97, a cylinder head cover 98, a crankcase 95, and an oil pan 96.

A plurality of cylinders 92 is provided in the cylinder block 91. Each cylinder 92 accommodates a piston 94 that reciprocates in conjunction with the rotation of the crankshaft accommodated in the crankcase 95.

An intake valve and an exhaust valve of the internal combustion engine 90 are assembled to the cylinder head 97. The cylinder head cover 98 attached to the cylinder head 97 covers the camshaft that drives the intake valve and the exhaust valve. The cylinder head cover 98 is made of a resin material. A baffle plate is attached to the cylinder head 97 side of the cylinder head cover 98.

The oil pan 96 stores oil used for lubricating each part of the internal combustion engine 90 and the hydraulic drive mechanism. The internal combustion engine 90 includes a combustion chamber 93 partitioned by the cylinder 92, the piston 94, and the cylinder head 97. The internal combustion engine 90 includes an intake passage 71 for introducing intake air into the combustion chamber 93. The internal combustion engine 90 is provided with an exhaust passage 78 that exhausts the air-fuel mixture combusted in the combustion chamber 93 as exhaust gas.

The internal combustion engine 90 includes a turbocharger 80. A turbine 82 of the turbocharger 80 is disposed in the exhaust passage 78. A compressor 81 connected to the turbine 82 is disposed in the intake passage 71.

An air cleaner 72 is provided upstream of the compressor 81 in the intake passage 71 of the internal combustion engine 90. An intercooler 73 is provided downstream of the compressor 81 in the intake passage 71. Further, a throttle valve 74 is provided downstream of the intercooler 73 in the intake passage 71. Further, an intake manifold 75 is provided downstream of the throttle valve 74 in the intake passage 71. The intake manifold 75 is connected to the cylinder head 97.

The intake air that has passed through the intake manifold 75 is introduced into the combustion chamber 93 via an intake port 76 provided in the cylinder head 97. The cylinder head 97 is provided with an exhaust port 77 for exhausting exhaust gas from the combustion chamber 93. The exhaust gas discharged from the combustion chamber 93 is discharged to the exhaust passage 78 through the exhaust port 77. The internal combustion engine 90 includes a blow-by gas processing device 30.

Blow-by Gas Processing Device 30

The blow-by gas processing device 30 includes a blow-by gas passage 49 that communicates the crankcase 95 and the intake passage 71, and recirculates the blow-by gas leaked from the combustion chamber 93 to the crankcase 95 into the intake passage 71.

A first separator 43 is provided in the blow-by gas passage 49 of the blow-by gas processing device 30. The first separator 43 separates oil contained in the blow-by gas from the blow-by gas. The first separator 43 is located in the cylinder head cover 98. The first separator 43 is connected to the intake manifold 75 of the intake passage 71 by a blow-by gas discharge pipe 47. As the blow-by gas discharge pipe 47, a rubber hose, a resin pipe, or the like can be used. The blow-by gas discharge pipe 47 is provided with a positive crankcase ventilation (PCV) valve 48 that opens and closes to enable and disable the communication between the first separator 43 and the intake manifold 75. The PCV valve 48 opens when the pressure in the intake manifold 75 is lower than the pressure in the first separator 43 to allow the first separator 43 and the intake manifold 75 to communicate with each other.

The blow-by gas processing device 30 includes a suction passage 41 for introducing the blow-by gas in the crankcase 95 into the first separator 43. The suction passage 41 is provided in the cylinder block 91 and the cylinder head 97.

The suction passage 41 is provided with a pre-separator 42 that separates oil from the blow-by gas passing through the suction passage 41.

The blow-by gas processing device 30 includes a connection pipe 31 for introducing fresh air from the intake passage 71 into the crankcase 95. As the connection pipe 31, a rubber hose, a resin pipe, or the like can be used. One end of the connection pipe 31 is connected to a portion of the intake passage 71 between the air cleaner 72 and the compressor 81. The other end of the connection pipe 31 is connected to a second separator 32 as an oil separator. The second separator 32 is provided in the cylinder head cover 98. The second separator 32 is partitioned by the cylinder head cover 98 and the baffle plate.

The second separator 32 includes a joint portion 10 for connecting the connection pipe 31. A pressure sensor 54 for detecting the pressure in the connection pipe 31 is connected to the joint portion 10 via a connection passage 60. The detection signal of the pressure sensor 54 is input to a control device of the internal combustion engine 90. The control device detects the pressure in the connection pipe 31 based on the detection signal of the pressure sensor 54, and detects an abnormality in the connection pipe 31 when the fluctuation of the pressure becomes larger than the specified range.

The cylinder block 91 is provided with a communication passage 99 that communicates with the crankcase 95. The intake passage 71 and the crankcase 95 are connected to each other via the connection pipe 31, the second separator 32, and the communication passage 99. In the following, the passage including the connection pipe 31 and connecting the intake passage 71 and the crankcase 95 may be referred to as a "fresh air introduction passage".

The blow-by gas processing device 30 includes an ejector 50 that generates a negative pressure as the turbocharger 80 is driven. The ejector 50 includes an ejector body 51 connected to the first separator 43. A first intake circulation passage 52 and a second intake circulation passage 53 are connected to the ejector body 51. The first intake circulation passage 52 is connected to a portion of the intake passage 71 between the compressor 81 and the intercooler 73, and the second intake circulation passage 53 is connected to a portion of the intake passage 71 between the air cleaner 72 and the compressor 81. The connection portion between the second intake circulation passage 53 and the intake passage 71 is located on the downstream side of the connection portion between the connection pipe 31 and the intake passage 71. The ejector body 51 includes a nozzle portion 51A that injects intake air supplied through the first intake circulation passage 52 to the second intake circulation passage 53 side. A diffuser portion 51B that gradually expands the air flow path is provided in the ejector body 51 on the second intake circulation passage 53 side with respect to the nozzle portion 51A. The ejector 50 is composed of the ejector body 51, the first intake circulation passage 52, and the second intake circulation passage 53.

When the internal combustion engine 90 is not operated in the turbocharging region and the pressure in the intake manifold 75 is lower than the pressure in the first separator 43, the PCV valve 48 is opened and the blow-by gas in the first separator 43 is introduced into the intake passage 71. At this time, the blow-by gas in the crankcase 95 is drawn into the first separator 43 through the suction passage 41. Further, the intake air is drawn into the crankcase 95 from the intake passage 71 through the fresh air introduction passage.

On the other hand, when the internal combustion engine 90 is operated in the turbocharging region, the intake air that has flowed into the first intake circulation passage 52 from the downstream side of the compressor 81 in the intake passage 71 is returned to the upstream side of the compressor 81 through the ejector body 51 and the second intake circulation passage 53. When the intake air passes through the nozzle portion 51A of the ejector body 51, a negative pressure is generated inside the ejector body 51. At this time, the ejector 50 sucks the blow-by gas in the crankcase 95 via the first separator 43. Then, the ejector 50 discharges the blow-by gas that has passed through the diffuser portion 51B, to the intake passage 71 via the second intake circulation passage 53.

When the internal combustion engine 90 is operated in the turbocharging region, the pressure of the blow-by gas that leaks from the combustion chamber 93 to the crankcase 95 is relatively high. When the pressure in the crankcase 95 is higher than the internal pressure in the portion of the intake passage 71 to which the connection pipe 31 is connected, the blow-by gas in the crankcase 95 flows into the intake passage 71 via the fresh air introduction passage. Even when the internal combustion engine 90 is not operated in the turbocharging region, for example, when the throttle valve 74 is fully open, the blow-by gas that has leaked from the combustion chamber 93 to the crankcase 95 may flow into the intake passage 71 via the fresh air introduction passage.

<About the 2 Separator 32>

Figure 2:
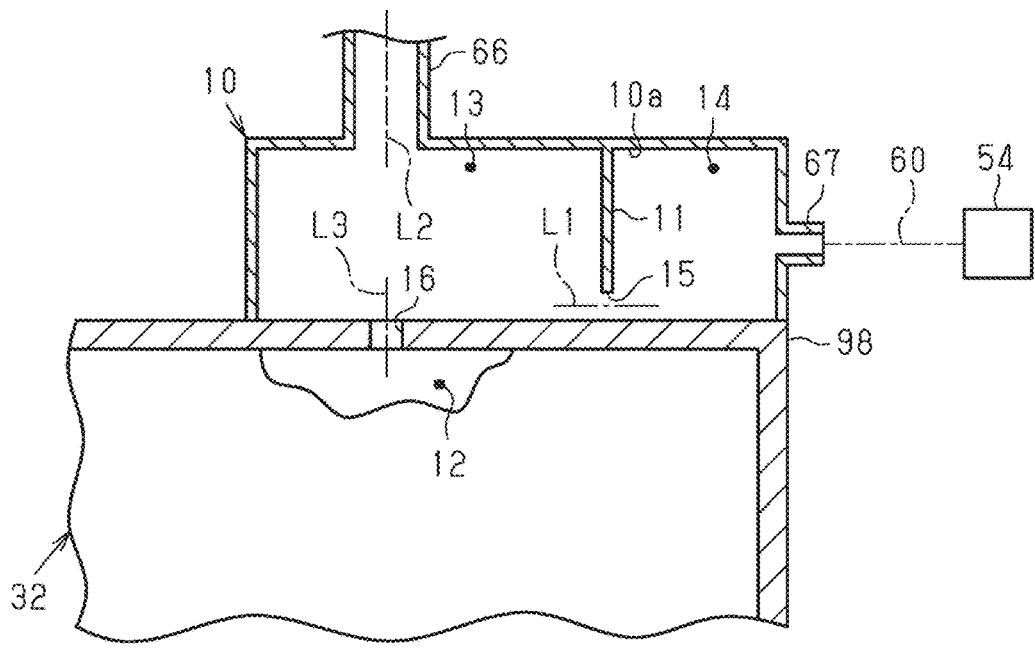
FIG. 2 is a cross-sectional view showing a second separator.

As shown in FIG. 2, a main chamber 12 is formed in a portion of the second separator 32 located in the cylinder head cover 98. The joint portion 10 of the second separator 32 is located outside the cylinder head cover 98. The joint portion 10 is welded to the cylinder head cover 98. A first sub-chamber 13 and a second sub-chamber 14 are formed inside the joint portion 10. The first sub-chamber 13 and the second sub-chamber 14 are partitioned by a partition wall 11. A communication hole 15 connecting the first sub-chamber 13 and the second sub-chamber 14 is formed in the partition wall 11. The first sub-chamber 13 is connected to the main chamber 12 via a throttle portion 16 that penetrates the cylinder head cover 98.

The joint portion 10 is formed with a first connection port 66 connected to the first sub-chamber 13 and a second connection port 67 connected to the second sub-chamber 14. The connection pipe 31 (FIG. 1) is connected to the first connection port 66. Therefore, the first sub-chamber 13 is connected to the intake passage 71 via the first connection port 66 and the connection pipe 31. The connection passage 60 is connected to the second connection port 67. Therefore, the second sub-chamber 14 is connected to the pressure sensor 54 via the second connection port 67 and the connection passage 60.

<For the First Sub-Chamber 13 and the Second Sub-Chamber 14>

As shown in FIG. 2, the partition wall 11 protrudes downward from the inner wall 10a of the upper end portion of the joint portion 10, that is, toward the cylinder head cover 98. The partition wall 11 is connected to the inner wall 10a of the joint portion 10. A gap is formed between the front end of the partition wall 11 in the protruding direction and the cylinder head cover 98. This gap serves as the communication hole 15. By forming the partition wall 11 in this manner, the first sub-chamber 13 and the second sub-chamber 14 in the joint portion 10 are positioned so as to be aligned along the cylinder head cover 98.

The communication hole 15 and the first connection port 66 are formed so that their axial L1,L2 do not coincide with each other. In addition, the communication hole 15 and the throttle portion 16 are formed so that their axial L1,L3 do not coincide with each other. The distance from the throttle portion 16 to the communication hole 15 is longer than the distance from the throttle portion 16 to the first connection port 66. The throttle portion 16 and the first connection port 66 are formed so that their axial L3,L2 coincide with each other.

The surface of the cylinder head cover 98 located in the second sub-chamber 14 is inclined downward toward the communication hole 15. As a result, a fluid such as water or oil that has entered the second sub-chamber 14 is caused to flow toward the communication hole 15. Further, the fluid is discharged from the communication hole 15 to the outside of the second sub-chamber 14. The flow cross-sectional area of the fluid in the communication hole 15 is determined in accordance with a pressure range desired to be detected by the pressure sensor 54, and is set to a value that allows the fluid to be discharged from the second sub-chamber 14. The flow cross-sectional area of the fluid in the communication hole 15 is made smaller than the flow cross-sectional area of the fluid in the first sub-chamber 13 and is made smaller than the flow cross-sectional area of the fluid in the second sub-chamber 14.

Next, the operation of the internal combustion engine 90 of the present embodiment will be described. The cylinder head cover 98 of the internal combustion engine 90 including the blow-by gas processing device 30 is provided with a joint portion 10 of the second separator 32 that functions as an oil separator. A connection pipe 31 is connected to the first connection port 66 of the joint portion 10. The connection pipe 31 is connected to the first sub-chamber 13 in the joint portion 10 via the first connection port 66. The first sub-chamber 13 is connected to the pressure sensor 54 via the communication hole 15 and the second sub-chamber 14 in the joint portion 10 and the connection passage 60. The position connected to the pressure sensor 54 in the first sub-chamber 13 is closer to the first connection port 66 than the throttle portion 16 of the second separator 32. Therefore, when an abnormality such as disconnection or damage of the connection pipe 31 occurs, as the first connection port 66 of the joint portion 10 is opened to the atmosphere, the detected value of the pressure sensor 54 tends to fluctuate so as to approach the atmospheric pressure. The abnormality can be detected by the variation of the detection value of the pressure sensor 54.

During operation of the internal combustion engine 90, pulsation of intake air occurs in the intake passage 71, and pulsation of gas occurs in the crankcase 95 due to reciprocation of the piston 94. These pulsations propagate to the first sub-chamber 13 of the joint portion 10. The pressure sensor 54 is connected to the first sub-chamber 13 via the connection passage 60, the second connection port 67, the second sub-chamber 14, and the communication hole 15. Therefore, when the pulsation moves from the first sub-chamber 13 toward the pressure sensor 54, the pulsation is relaxed in the second sub-chamber 14. Therefore, it is possible to prevent the pressure value detected by the pressure sensor 54 from fluctuating due to the influence of the pulsation. As a result, it is possible to prevent an abnormality such as disconnection or damage of the connection pipe 31 from being properly detected by monitoring the pressure value detected by the pressure sensor 54.

The first sub-chamber 13 and the second sub-chamber 14 are formed by partitioning the joint portion 10 by the partition wall 11. For this reason, a second sub-chamber 14 for mitigating the pulsation is provided without taking a large space. Therefore, the structure for relaxing the pulsation can be realized with a small space.

According to the present embodiment described in detail above, the following effects can be obtained.

(1-1) The pressure value detected by the pressure sensor 54 can be prevented from fluctuating due to the influence of the pulsation, and the structure for relaxing the pulsation can be realized with a small space.

(1-2) The joint portion 10 is welded to the cylinder head cover 98. The first sub-chamber 13 and the second sub-chamber 14 formed inside the joint portion 10 are positioned so as to be aligned along the cylinder head cover 98. Therefore, the amount of projection of the joint portion 10 from the cylinder head cover 98 can be suppressed to be small.

(1-3) The communication hole 15 and the first connection port 66 of the joint portion 10 are formed so that their axial L1,L2 do not coincide with each other. Therefore, even if the pulsation of the intake air in the internal combustion engine 90 propagates to the first sub-chamber 13 via the connection pipe 31 and the first connection port 66, the pulsation is less likely to propagate to the second sub-chamber 14 via the communication hole 15. Therefore, it is possible to more effectively suppress a fluctuation caused by the influence of the pulsation in the pressure value detected by the pressure sensor 54.

(1-4) The communication hole 15 and the throttle portion 16 are formed so that their axial L1,L3 do not coincide with each other. Therefore, even if the pulsation of the gas in the crankcase 95 in the internal combustion engine 90 propagates to the first sub-chamber 13 through the main chamber 12 and the throttle portion 16, the pulsation is less likely to propagate to the second sub-chamber 14 through the communication hole 15. Therefore, it is possible to more effectively suppress a fluctuation caused by the influence of the pulsation in the pressure value detected by the pressure sensor 54.

(1-5) Since the partition wall 11 is connected to the inner wall 10a of the joint portion 10, the joint portion 10 can be reinforced by the partition wall 11. Therefore, it is possible to suppress the vibration of the joint portion 10 and the generation of noise caused by the vibration.

(1-6) The throttle portion 16 and the first connection port 66 are formed so that their axial L3,L2 coincide with each other. Therefore, the flow of gas between the throttle portion 16 and the first connection port 66 in the first sub-chamber 13 can be made smooth. This makes it difficult for the pulsation to propagate to the second sub-chamber 14 through the communication hole 15. Therefore, it is possible to more effectively suppress a fluctuation caused by the influence of the pulsation in the pressure value detected by the pressure sensor 54.

(1-7) The distance from the throttle portion 16 to the communication hole 15 is longer than the distance from the throttle portion 16 to the first connection port 66. Therefore, the second sub-chamber 14 can be further separated from the gas flow between the throttle portion 16 and the first connection port 66. This makes it difficult for the pulsation to propagate to the second sub-chamber 14 through the communication hole 15. Therefore, it is possible to more effectively suppress a fluctuation caused by the influence of the pulsation in the pressure value detected by the pressure sensor 54.

(1-8) The surface of the cylinder head cover 98 located in the second sub-chamber 14 is inclined downward toward the communication hole 15. Accordingly, a fluid such as water or oil that has entered the second sub-chamber 14 can flow toward the communication hole 15 and be discharged from the communication hole 15 to the outside of the second sub-chamber 14.

(1-9) The communication hole 15 is formed between the end portion of the partition wall 11 and the cylinder head cover 98. Warm oil is scattered inside the cylinder head cover 98 during operation of the internal combustion engine 90. Therefore, it is possible to prevent the communication hole 15 from being blocked by freezing of moisture at low temperatures.

A 2nd Embodiment

Figure 3:
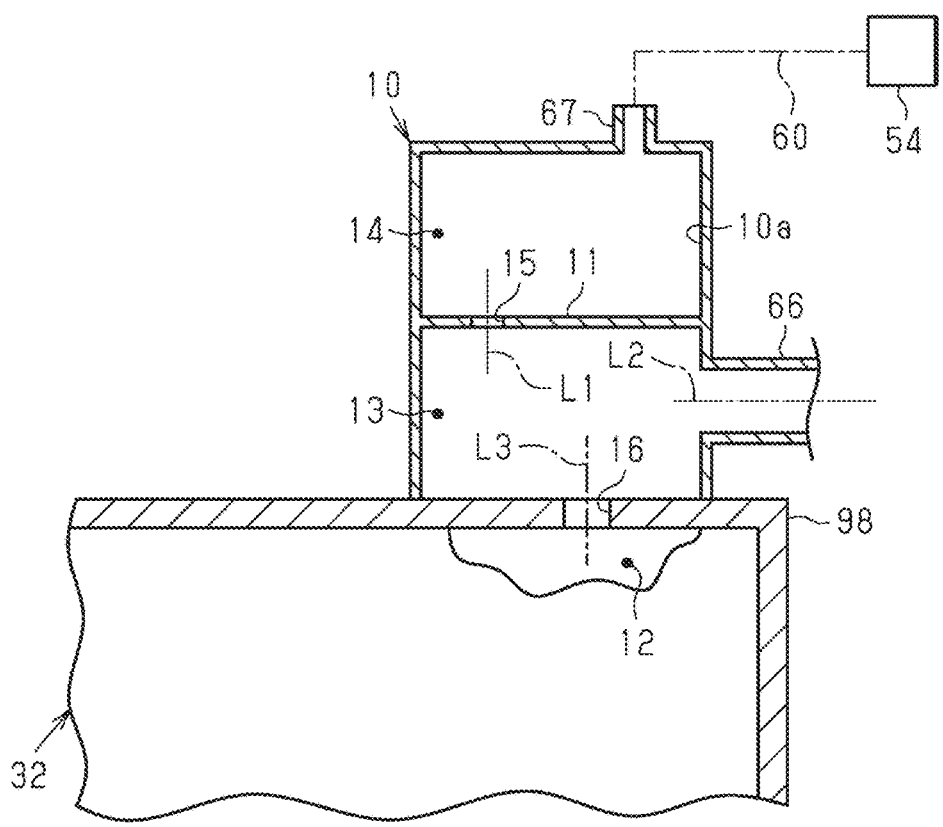
FIG. 3 is a cross-sectional view showing a second separator.

Next, a second embodiment of the internal combustion engine will be described with reference to FIG. 3. FIG. 3 shows a second separator 32 in the internal combustion engine 90 of this embodiment. As can be seen from FIG. 3, the inside of the joint portion 10 in the second separator 32 is partitioned into a first sub-chamber 13 and a second sub-chamber 14 by a partition wall 11 extending in the left-right direction in FIG. 3. The partition wall 11 is connected to the inner wall 10a of the joint portion 10. The first sub-chamber 13 is located closer to the cylinder head cover 98 than the partition wall 11. The first sub-chamber 13 is connected to the throttle portion 16. The second sub-chamber 14 is located farther from the cylinder head cover 98 than the partition wall 11.

A communication hole 15 is formed in the partition wall 11 so as to penetrate the partition wall 11. The partition wall 11 is inclined downward toward the communication hole 15. In other words, the communication hole 15 is located at the lowermost point of the partition wall 11.

A first connection port 66 and a second connection port 67 are formed in the joint portion 10. The first connection port 66 is connected to the first sub-chamber 13, and the second connection port 67 is connected to the second sub-chamber 14. The communication hole 15 and the first connection port 66 are formed so that their axial L1,L2 do not coincide with each other. In addition, the communication hole 15 and the throttle portion 16 are formed so that their axial L1,L3 do not coincide with each other. The distance from the throttle portion 16 to the communication hole 15 is longer than the distance from the throttle portion 16 to the first connection port 66.

According to the present embodiment, in addition to the same effects as (1-1), (1-3) to (1-5), and (1-7) of the first embodiment, the following effects can be obtained. (2-1) The partition wall 11 is inclined downward toward the communication hole 15. Accordingly, a fluid such as water or oil that has entered the second sub-chamber 14 can flow toward the communication hole 15 and be discharged from the communication hole 15 to the outside of the second sub-chamber 14.

Other Embodiments

Note that the above-described embodiments can be modified as follows, for example. The above embodiments and modification examples described below may be carried out in combination of each other within a technically consistent range.

In the first embodiment, the communication hole 15 may not be formed by a gap between the front end of the partition wall 11 in the protruding direction and the cylinder head cover 98. For example, the partition wall 11 contacts the cylinder head cover 98, and the communication hole 15 penetrates the partition wall 11. In this case, a plurality of communication holes 15 may be formed. At least one of the plurality of communication holes 15 is configured to be capable of discharging a liquid such as water or oil from the second sub-chamber 14 to the first sub-chamber 13.

In the first embodiment, the partition wall 11 may protrude upward from the cylinder head cover 98 in FIG. 2 and contacts the inner wall 10a of the joint portion 10. In this case, the communication hole 15 penetrates the partition wall 11 as described above.

In the first embodiment, the surface of the cylinder head cover 98 located in the second sub-chamber 14 does not necessarily have to be inclined downward toward the communication hole 15.

In the second embodiment, the partition wall 11 does not necessarily have to be inclined downward toward the communication hole 15.

In the second embodiment, the communication hole 15 and the first connection port 66 of the joint portion 10 may have the same axial L1,L2.

Figure 4:
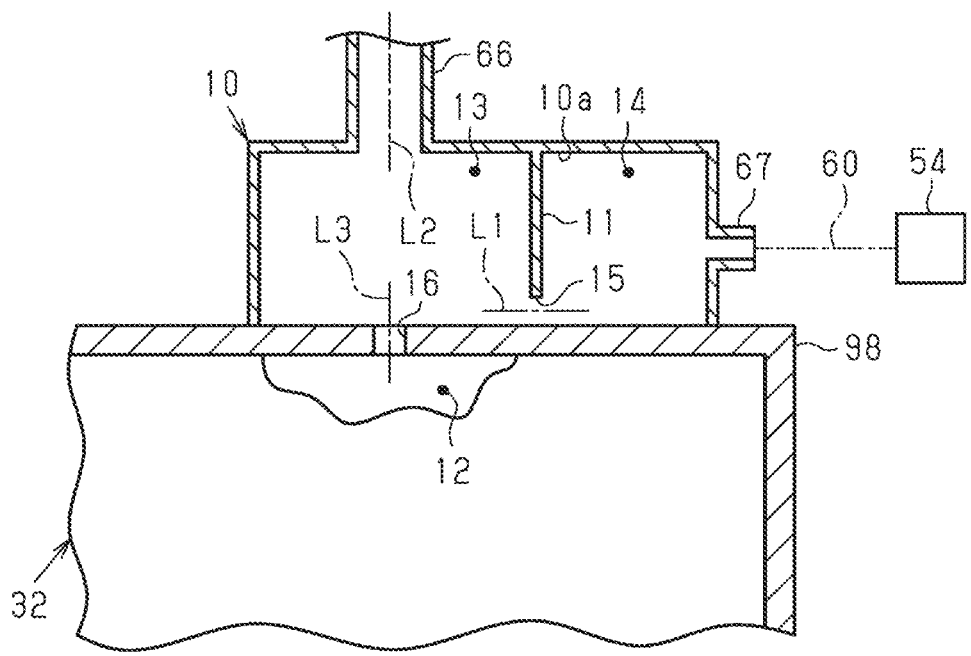
FIG. 4 is a cross-sectional view showing another example of the second separator.

In the first and second embodiments, the distance from the throttle portion 16 to the communication hole 15 is not necessarily longer than the distance from the throttle portion 16 to the first connection port 66. For example, as illustrated in FIG. 4, the distance from the throttle portion 16 to the communication hole 15 may be shorter than the distance from the throttle portion 16 to the first connection port 66. In this case, it is preferable that the throttle portion 16 and the first connection port 66 are formed so that the axial L3,L2 of the throttle portion 16 and the first connection port 66 coincide with each other.

Figure 5:
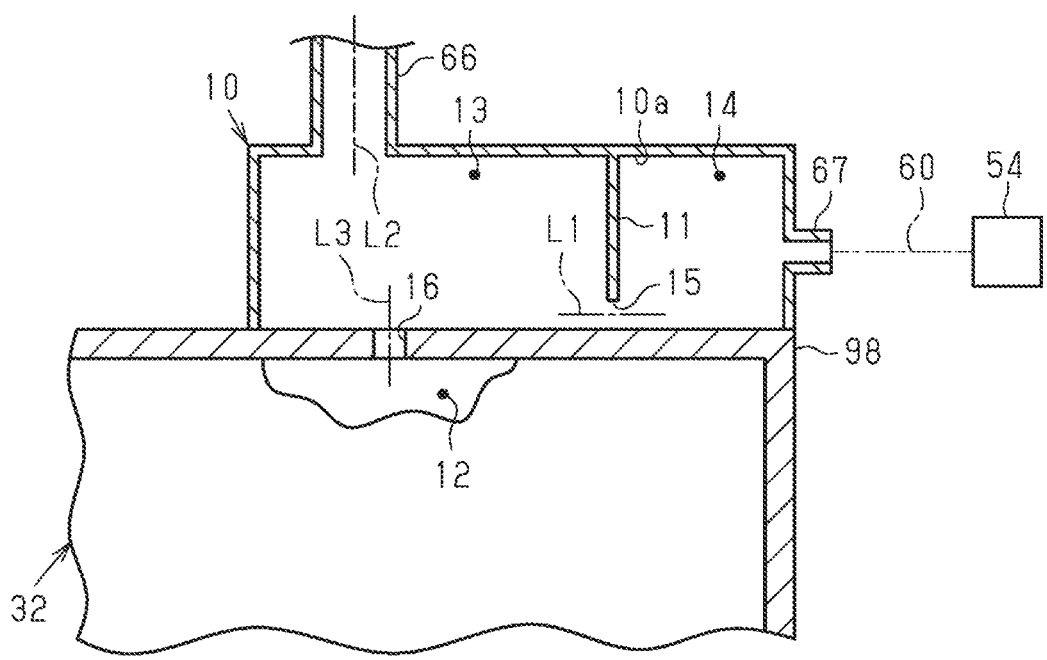
FIG. 5 is a cross-sectional view illustrating another example of the second separator.

In the first embodiment, as shown in FIG. 5, the throttle portion 16 and the first connection port 66 may not have the same axial L3,L2. In this case, it is preferable that the distance from the throttle portion 16 to the communication hole 15 is longer than the distance from the throttle portion 16 to the first connection port 66.

In the second embodiment, the opening on the side of the first sub-chamber 13 of the communication hole 15 may extend into the first sub-chamber 13, or the opening on the side of the second sub-chamber 14 may extend into the second sub-chamber 14. In these cases, since the resistance when the gas passes through the communication hole 15 increases, the pulsation of the gas is less likely to be transmitted from the first sub-chamber 13 to the second sub-chamber 14. In addition, when only the opening portion of the communication hole 15 on the side of the first sub-chamber 13 extends into the first sub-chamber 13, it is possible to suppress deterioration in the dischargeability of the fluid such as water and oil from the second sub-chamber 14 to the first sub-chamber 13.

Although the internal combustion engine 90 according to the first and second embodiments includes the turbocharger 80, the turbocharger 80 is not an essential configuration. Even in the internal combustion engine 90 that does not include the turbocharger 80, the abnormality of the connection pipe 31 can be detected by the pressure sensor 54 as in the above embodiment. Even in the internal combustion engine 90 that does not include the turbocharger 80, when the throttle valve 74 is fully open, the blow-by gas that has leaked from the combustion chamber 93 to the crankcase 95 may flow into the intake passage 71 via the fresh air introduction passage.

In the internal combustion engine 90 according to the first and second embodiments, a negative pressure is generated by the ejector 50 when the internal combustion engine 90 is operated in the supercharging region, and blow-by gas is discharged to the intake passage 71, but the ejector 50 may be omitted. In this case, when the internal combustion engine 90 is operated in the turbocharging region, the blow-by gas can be discharged to the intake passage 71 through the fresh air introduction passage.

The first separator 43 in the first and second embodiments may have the same configuration as the second separator 32, and the pressure sensor 54 may be connected to the second sub-chamber of the joint portion to which the blow-by gas discharge pipe 47 is attached to the first separator 43. In this case, the pressure sensor 54 detects an abnormality in the blow-by gas discharge pipe 47.

What is claimed is:

1. An internal combustion engine comprising a blow-by gas processing device that processes blow-by gas that has leaked from a combustion chamber to a crankcase, by causing the blow-by gas to return to an intake passage, wherein:

the blow-by gas processing device includes an oil separator, a connection pipe, and a pressure sensor;

the oil separator is provided in a cylinder head cover, includes a main chamber and a sub-chamber provided inside, and includes a joint portion constituting the sub-chamber and a throttle portion connecting the sub-chamber to the main chamber;

the sub-chamber is a first sub-chamber and a second sub-chamber partitioned by a partition wall;

a communication hole connecting the first sub-chamber and the second sub-chamber is provided in the partition wall;

the first sub-chamber is connected to the main chamber via the throttle portion;

a first connection port connected to the first sub-chamber and a second connection port connected to the second sub-chamber are provided in the joint portion;

the first connection port is connected to the intake passage via the connection pipe; and the second connection port is connected to the pressure sensor.

2. The internal combustion engine according to claim 1, wherein:

the main chamber of the oil separator is located on an inner side of the cylinder head cover;

the joint portion of the oil separator is located on an outer side of the cylinder head cover; and the first sub-chamber and the second sub-chamber in the joint portion are disposed along the cylinder head cover.

3. The internal combustion engine according to claim 1, wherein the communication hole and the first connection port are provided such that axes of the communication hole and the first connection port do not coincide with each other.

4. The internal combustion engine according to claim 1, wherein the communication hole and the throttle portion are provided such that axes of the communication hole and the throttle portion do not coincide with each other.

5. The internal combustion engine according to claim 1, wherein the partition wall is connected to an inner wall of the joint portion.

6. The internal combustion engine according to claim 1, wherein the throttle portion and the first connection port are provided such that axes of the communication hole and the first connection port coincide with each other.

7. The internal combustion engine according to claim 1, wherein a distance from the throttle portion to the communication hole is longer than a distance from the throttle portion to the first connection port.

* * * * *